UNITED STATES PATENT OFFICE.

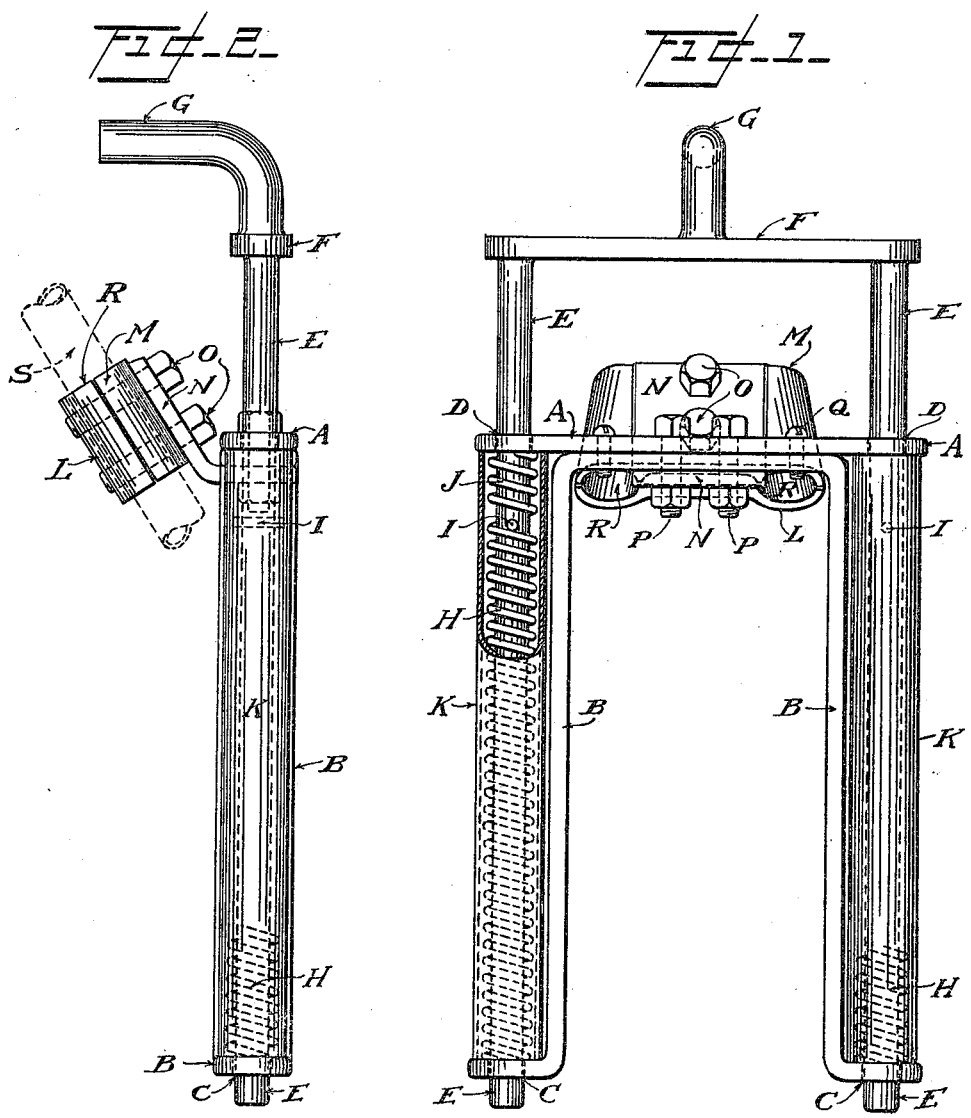

EDWARD LOUDENCLOS, OF PASADENA, CALIFORNIA.

MOTOR-CYCLE SHOCK-ABSORBER.

962,443.  Specification of Letters Patent.  Patented June 28, 1910.

Application filed March 11, 1910. Serial No. 548,547.

*To all whom it may concern:*

Be it known that I, EDWARD LOUDENCLOS, a citizen of the United States, and a resident of Pasadena, in the county of Los Angeles and State of California, have invented certain new and useful Improvements in Motor-Cycle Shock-Absorbers, of which the following is a specification.

My invention relates to the kind of shock absorbers which are used on motor-cycles directly under the seat of the rider, to take up the shock of bumps on the road, the objects being to make riding easier, increase the wear of the tires by keeping the rims from denting, and provide a device of the sort which is adjustable to any machine. These objects I attain to a more satisfactory degree than heretofore by means of the features hereinafter shown and described.

I illustrate my invention by the accompanying drawings, in which:

Figure 1 is a front elevation. Fig. 2 is a side view.

As shown, the device is composed of a bridge plate F, to which the bent saddle-post-support G and the plungers E are brazed. The seat for the rider is fastened to the saddle-post support G in the usual manner. The yoke B having a top-plate A is bolted to the rear tubing of the motor-cycle-frame by means of the clamps L, M, held by a plate N bolted to the yoke B and the top-plate A by bolts and nuts shown at P. The top-plate A is provided with the plunger-holes D, and screwed to the yoke B at the points marked Q. The bent ends of the yoke B are provided with the plunger-holes C. Coil-springs J interpose between C and D. The plungers E would be free to move up or down within the springs J if it were not for the pins I resting against the springs, incased as they are in the tubes K which are filled with cup-grease.

In practice the weight of the rider will compress that portion of the springs J below the pins I, at the same time expanding the space between D and I. The free movement of the plungers E is in nowise interfered with at the openings C and D. In this way the springs are caused to take up the jar in two ways, by compression and recoil. The seat is allowed free up and down play, whereas in most other devices of the sort, the front of the seat is held more or less stationary.

Instead of wabbling from side to side, my shock absorber provides a rigid and stable seat with plenty of up and down give but no side play.

Having now described my invention, I claim as new:

The combination in shock absorbers interposed between the seat of a rider and a vehicle, comprising a yoke B having secured thereto a top-plate A and means whereby it may be secured to the vehicle, a bridge-plate F with plungers E provided with pins I, means to fasten a seat to the said bridge-plate, and recoil springs interposing between ends of the said top-plate A and the bent ends of the said yoke B, the said ends of the top-plate and yoke having holes D and C adapted to receive the said plungers E, substantially as shown and described.

Signed at Pasadena in the county of Los Angeles and State of California this fifteenth day of December A. D. 1909.

EDWARD LOUDENCLOS.

Witnesses:
  GERTRUDE B. ANDREAE,
  HENRY FIELD.